United States Patent
Batali (10) Patent No.: US 8,554,779 B1
(45) Date of Patent: Oct. 8, 2013

(54) PROTECTING PRIVACY IN AUDIENCE DATA

(75) Inventor: John D. Batali, Kirkland, WA (US)

(73) Assignee: Google Inc., Mountain View, CA (US)

( * ) Notice: Subject to any disclaimer, the term of this patent is extended or adjusted under 35 U.S.C. 154(b) by 359 days.

(21) Appl. No.: 12/429,566

(22) Filed: Apr. 24, 2009

Related U.S. Application Data (60) Provisional application No. 61/047,641, filed on Apr. 24, 2008.

(51) Int. Cl.
*G06F 7/00* (2006.01)
*G06F 17/30* (2006.01)

(52) U.S. Cl.
USPC .......................................... 707/757; 707/780

(58) Field of Classification Search
USPC ................... 707/757, 999.005, 780
See application file for complete search history.

(56) References Cited

U.S. PATENT DOCUMENTS

| | | | | |
|---|---|---|---|---|
| 2001/0034740 A1* | 10/2001 | Kerne | ........................... | 715/202 |
| 2003/0084043 A1* | 5/2003 | Acharya et al. | ........ | 707/999.005 |
| 2003/0188171 A1* | 10/2003 | DeCenzo et al. | ............. | 713/185 |
| 2004/0259099 A1* | 12/2004 | Katoh et al. | ....................... | 435/6 |
| 2006/0004691 A1* | 1/2006 | Sifry | ....................... | 707/999.001 |
| 2006/0200431 A1* | 9/2006 | Dwork et al. | ................... | 706/12 |
| 2006/0247054 A1* | 11/2006 | Branson et al. | ................. | 463/42 |
| 2007/0168931 A1* | 7/2007 | Martin et al. | ................. | 717/104 |

OTHER PUBLICATIONS

Dwork and Nissim, "Privacy-Preserving Datamining on Vertically Partitioned Databases" The 24th Annual International Cryptography Conference, Aug. 15-19, 2004, Crypto 2004 (17 pages).

Dinur and Nissim, "Revealing Information while Preserving Privacy" Proceedings of the Twenty-Second ACM SIGACT—SIGMOD—SIGART Symposium on Principles of Database Systems, Jun. 9-12, 2003 (16 pages).

Chawla S., et al., "Toward Privacy in Public Databases*" Proceedings of the 2nd IACR Theory of Cryptography Conference, Feb. 10-12, 2005 (23 pages).

(Continued)

*Primary Examiner* — Etienne Leroux
*Assistant Examiner* — Bryan Walker
(74) *Attorney, Agent, or Firm* — Fish & Richardson P.C.

(57) ABSTRACT

Methods, systems and apparatus, including computer program products, for generating respective random weights for identified audience members matching an audience specification in order to mask the behavior of individuals. The mean value of the random weights for large audience results approaches one so that a sum of the weights approximates a count of the matching records.

12 Claims, 6 Drawing Sheets

(56) References Cited

OTHER PUBLICATIONS

Blum A., et al., "Practical Privacy: The SuLQ Framework" Proceedings of the 24$^{th}$ ACM SIGMOD International Conference on Management of Data/Principles of Database Systems, Jun. 13-16, 2005 (15 pages).

Dwork C., et al., "Calibrating Noise to Sensitivity in Private Data Analysis" Proceedings of the 3$^{rd}$ IACR Theory of Cryptography Conference, Mar. 4-7, 2006 (20 pages).

Dwork C., et al., "Our Data, Ourselves: Privacy via Distributed Noise Generation" The 25$^{th}$ International Cryptology Conference, Eurocrypt 2006, May 28-Jun. 1, 2006 (18 pages).

Barak B., "Privacy, Accuracy, and Consistency Too: A Holistic Solution to Contingency Table Release" Proceedings of the 26$^{th}$ ACM SIGACT-SIGMOD-SIGART Symposium on Principles of Database Systems, Jun. 11-13, 2007 (9 pages).

Dwork, C., et al., "The Price of Privacy and the Limits of LP Decoding" Proceedings of the 39$^{th}$ Annual ACM Symposium on Theory of Computing, Jun. 11-13, 2007 (10 pages).

Dwork, C., et al., "Differentially Private Marginals Release with Mutual Consistency and Error Independent of Sample Size" Proceedings of the Joint UMECE—Euro-Stat Work Session on Statistical Data Confidentiality, Dec. 19, 2007 (12 pages).

Dwork, C., "Helping Kinsey Compute Statistics With Secrecy" University of Washington, Dec. 1, 2005 (presentation).

\* cited by examiner

PROTECTING PRIVACY IN AUDIENCE DATA

RELATED APPLICATIONS

This application claims the benefit of U.S. Provisional Patent Application No. 61/047,641, filed Apr. 24, 2008, the entire contents of which are incorporated herein by reference.

BACKGROUND

The present disclosure relates to information gathering.

Traditional audience data collection methods include using surveys to determine, for example, an estimated audience size of a given television program based on an extrapolation of a percentage of survey respondents. Modern content delivery mediums now permit faster and more accurate methods of audience data collection. Instead of relying on survey responses, actual audience counts can be collected at the point of access and returned, for example, over a network to a central system for processing. For example, web site visitor data and keywords used in search queries can be collected at a user's computer and transmitted over the Internet. Other examples include a television set-top box that makes a record of which programs the box was tuned to and returns this data to a server over a phone line or the Internet and collection of radio listener data returned over a cellular connection.

Enhanced accuracy in audience data, however, brings with it concerns regarding how the collected data might be abused. Rather than providing aggregate information for large groups, audience data can, in some cases, include data that can be used to determine the habits and preferences of individuals or small groups with identifiable members.

SUMMARY

In general, one aspect of the subject matter described in this specification can be embodied in methods that include the actions of receiving a query request including an audience specification, identifying a plurality of audience member identifiers corresponding to audience members that meet the specification, generating a respective random weight value for each audience member identifier, and generating a query result value based on the weight values. Other embodiments include corresponding systems, apparatus, and computer program products.

In particular implementations generating a respective random weight value for each identified audience member identifier includes generating a random number, and generating a weight value based on the random number and the audience identifier. The audience member identifiers are can be integers, and the respective random weights can be based on a product of the corresponding audience member identifiers and a respective random number. In some implementations weights are generated by multiplying the audience member identifier by a random number output by a random number generator to create a product, converting the product to a decimal number between zero and 1, and generating a weight that is the negative log of the decimal number. An average of the assigned weights can approach 1 as the number of identified audience member identifiers increases. In some implementations, the query result value is consistent irrespective of an order in which multiple criteria appear in the audience specification.

Particular embodiments of the subject matter described in this specification can be implemented to realize one or more of the following advantages. Accurate approximations of actual audience counts can be provided while information regarding individual behavior included in audience data is obfuscated.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
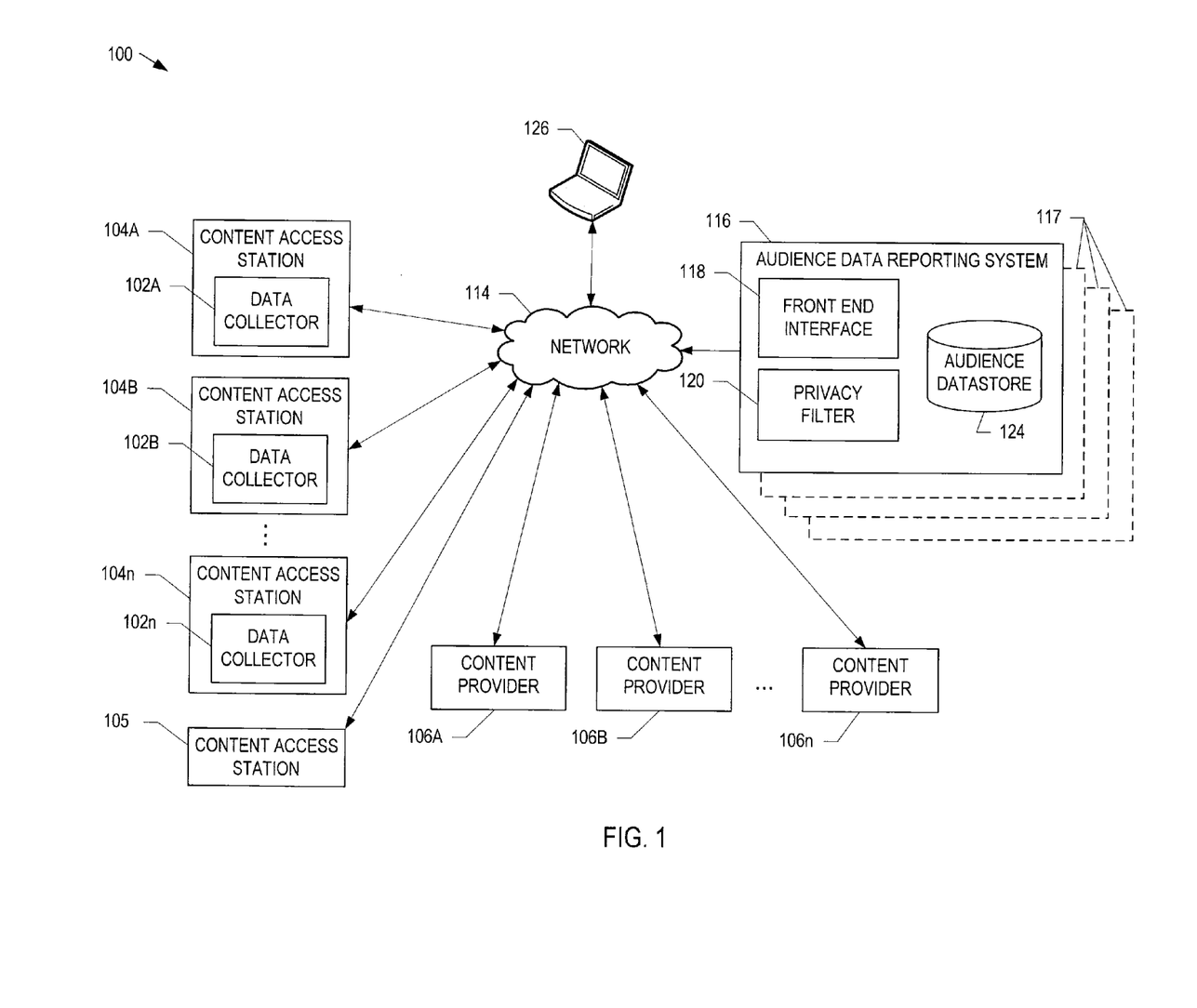
FIG. 1 is a block diagram of an example environment of an audience data reporting system.

FIG. 1 is a block diagram of an example environment 100 of an audience data reporting system 116. The audience data reporting system 116 includes an audience data store 124, a front end interface 118 and an obfuscation filter 120.

In some implementations, data in the audience data store 124 of the audience data reporting system 116 is collected from data collectors 102A-102n at one or more content access stations 104A-104n. Content access stations 104A-104n can be used to access content made available by content providers 106A-106n. For example, the content access stations 104A-104n can be televisions, television set top boxes, personal computers (such as the computer 126), radios, mobile phones, PDAs, or other electronics capable of accessing available content. The content made available by the content providers 106A-106n can include, for example, television programs, radio programs, video clips, audio clips, advertisements, and website content.

Data collectors 102A-102n can record which content is accessed at the content access stations 104A-104n by users of the system. In some implementations, the users are required to opt-in to send this information to the audience data reporting system. The collected data can include, for example, an identification of the content accessed, the time the content was accessed, and/or how long the content was accessed. The collected data can be transmitted over the network 114 to the audience data reporting system 116 and stored in the audience data store 124. In an implementation, the collected data is transmitted periodically to the audience data reporting system 116, and the data is aggregated at the audience data reporting system and stored in the audience data store 124. In some implementations, the audience data reporting system includes multiple shards 117 for distributing the query processing loads across multiple servers.

In some implementations, the data collectors 102A-102n are computer programs installed on personal computers that are used as content access stations. For example, the data collectors 102A-102n can be software installed on personal computers having web browser applications. In some implementations, the data collectors 102A-102n are web browser plug ins. In some implementations, the data collectors 102A-102n are web search toolbar applications. An installation process of the data collectors can provide users with an option to opt in or opt out of the data collection program. The installation process can include a notice to a user as to the scope of the data collection (e.g, that data regarding the user's Internet browsing activities, such as sites accessed, and search queries performed, will be recorded) and how the data will be used.

Audience data received at the audience data reporting system 116 can include an identifier that indicates which of the data collectors 102A-102n sent the corresponding data. The identifier can be, for example, an integer or a string that is unique among the data collectors 102A-102n, but does not personally identify a user of the content access stations 104A-104n. In some embodiments, the data collector identifier is stored in a web browser cookie and changes for a given data collector 102A-102n after a period of time. In some embodiments, respective data collector identifiers are stored for multiple users of a given content access station. For example, for a data access station used by two individuals who log into the data access station using different usernames, a separate data collector identifier can be issued to each user and stored in respective web browser cookies. The data collector identifier is considered as an audience member identifier for purposes of providing query responses to queries sent to the audience data reporting system 116 and will be referred to as such below.

Audience member identifiers stored in association with content identifiers in the audience data store 124 can be stored in entries and/or records of the audience data store. In some implementations, the audience member identifier is stored in association with content identifiers that indicate particular content accessed at the content access station. For example, an audience member identifier can be stored in association with television shows that were tuned to by a set top box, radio programs received at a radio, websites visited by a personal computer, and/or search terms used in keyword searches initiated at a personal computer.

The audience data reporting system 116 includes a front end interface 118 for providing access to the audience data stored in the audience data store 124. For example, the front end interface 116 can serve HTML over the network 114 to a user computer 126 which is then rendered by a web browser of the computer 126 to display a user interface at the computer 126, with the computer 126 functioning as a user interface device. The user interface can permit a user of the computer 126 to, for example, perform queries of the data in the audience data store 124. A user of the computer 126 can enter an audience specification. An audience specification can be one or more criterion used to query the audience data reporting system. The audience data reporting system 116 can search the audience datastore 124 for data that matches the audience specification and report the results to the user. The privacy filter 120 can be configured to implement one or more privacy policies by, for example, performing operations on data from the audience data store 124 before that data is returned to in response to a user query. In some implementations, query responses are based on searches of recent audience data. For example, query responses can be based on audience data collected during a most recent aggregation period.

In some embodiments, one or more of the content providers 106A-106n can store audience data that can be forwarded or accessed by the audience data reporting system 116. For example, the content provider 106A can store audience data of visitors to a website of the content provider 106A. Activity can be attributed to separate user based on, for example, a login id, a browser cookie, or an IP address of the content access station 105. The collected data can be transmitted to the audience data reporting system for storage in the audience datastore 124.

The system architecture depicted in FIG. 1 is only an example. Other configurations are possible and can be used to collect audience data for reporting purposes.

Figure 2:
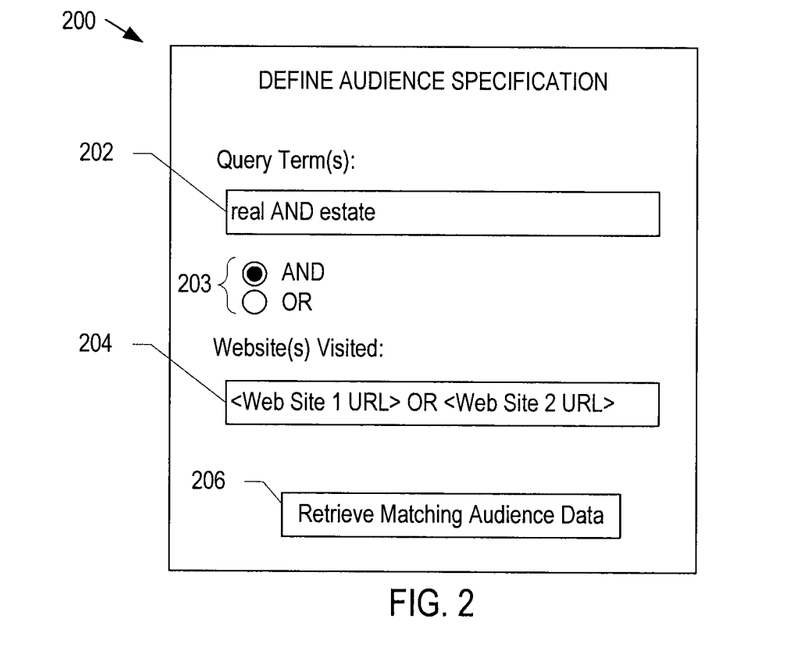
FIG. 2 is an example user interface page for entering a search that includes an audience specification.

FIG. 2 is an example user interface page 200 for entering an audience specification. The example user interface page 200 can be rendered in a web browser on client device, such as the computer 126, from data received from the front end interface 118 of the audience data reporting system 116 of FIG. 1. Alternative interfaces, however, can be used. The audience specification can be related to web page audience data, television audience data, radio audience data, and/or audience data for other content.

An audience specification can be input to the interface page 200. The audience specification can be sent to the audience data reporting system 116 to identify audience member identifiers that meet the audience specification. For example, an audience specification criterion can include a web site address, and the audience data can be searched for audience member identifiers that are stored in the audience data store 124 in association with a content identifier corresponding to the web site address. Other examples of audience specification criteria include a keyword used in a search, television show, and a radio program. A given audience specification can include multiple criteria joined by Boolean operators. For example, an audience specification can include multiple criteria so that the audience data is searched for audience members that visited <Web Site URL 1> OR<Web Site URL 2> AND searched for the keywords "real" AND "estate".

In the user interface page 200, one or more query terms can be entered into field 202. The query terms can be separated by the Boolean operators AND and OR, or other operators that can be entered by the user, such as NOT, XOR, etc. One or more web site addresses can be entered into field 204. The web site addresses can be separated by the Boolean operators. In some implementations AND is presumed unless another operator is specified, and parentheses can be used to control the order in which Boolean operations are performed. Radio buttons 203 are used to specify a Boolean operator between the query terms and the websites visited fields. Selection of the button 206 submits the audience specification to the audience data reporting system 116.

Figure 3:
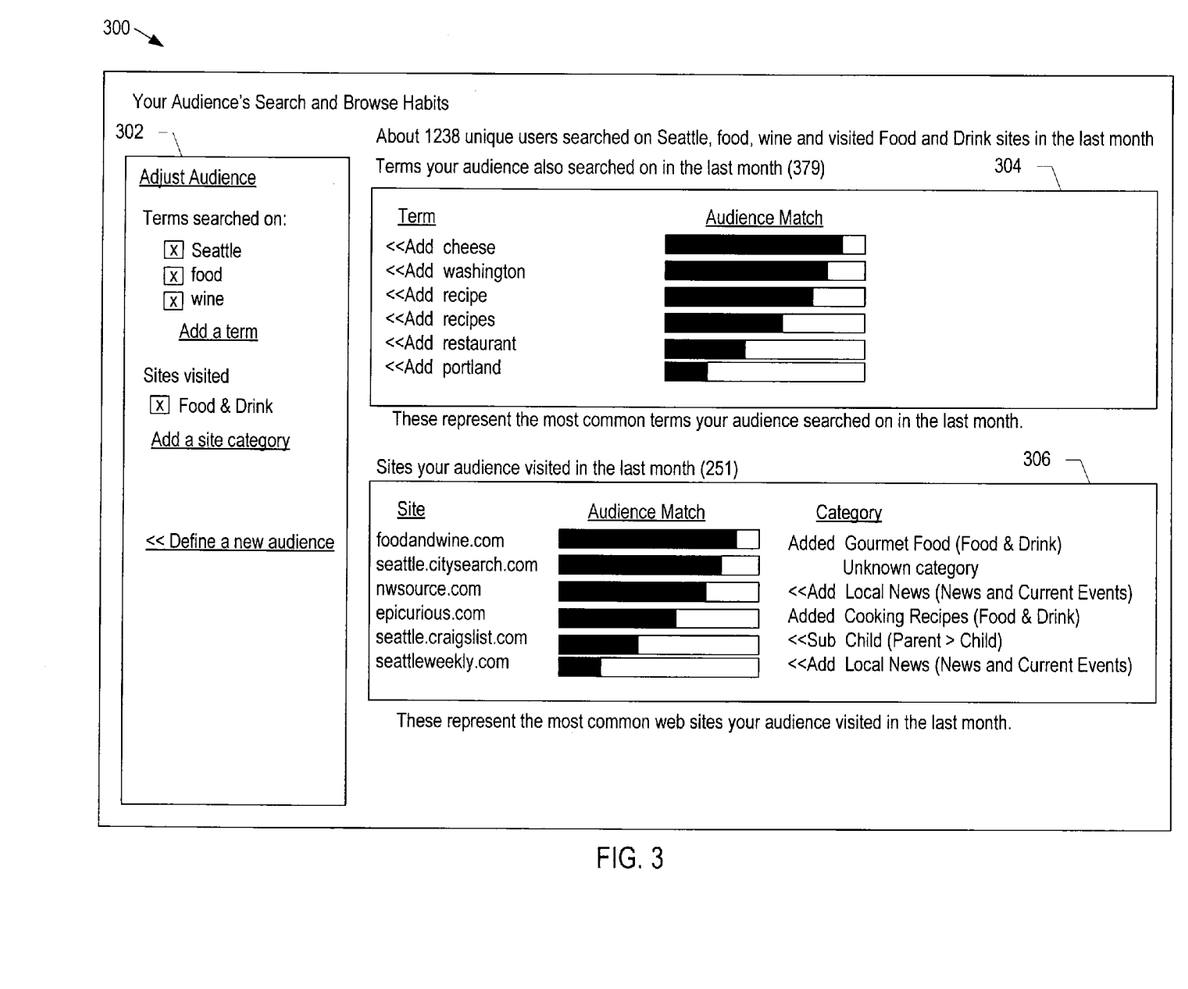
FIG. 3 is an example user interface page for displaying results of the search with related audience data information.

FIG. 3 is an example user interface page 300 for displaying results of a search with related audience data information. The interface page 300 includes refinement area 302 for adjusting an audience specification, additional terms area 304 for providing additional terms for which the audience searched, and additional sites area 306 for providing additional web sites that that the audience visited.

The user interface page 300 presents result data that has been modified, for example, by the privacy filter 120 to obfuscate behavioral details of individuals and/or small groups. Actual audience counts are sometimes preferable percentages or ratios as this information can provide details useful to, for example, sponsors in selecting content for placement of an advertisement. Unfortunately, providing actual audience counts can increase the risk of exposing the habits of individual audience members or small groups of audience members that might find the divulgation of this information offensive. This risk can lead to individual audience members deciding to not opt into the audience data collection program, and/or generally degrade the user experience.

In order to guard against the divulgation of such identifying data, limitations can be placed on searches that are permitted on the audience data and/or data provided in response to such searches. For example, a minimum threshold can be set for a returned count matching an inputted audience specification. Requiring that a lower threshold be met masks the habits of small groups and individuals to a degree.

A user attempting to abuse the system in order to determine habits of individuals or small groups is referred to as an "attacker". If the attacker knows of an audience specification that is satisfied only by a target individual (known by the attacker to have opted into the data collection program of the audience data reporting system 116) and the attacker also knows at least one audience specification not satisfied by the target individual that has a resulting count that exceeds the minimum threshold, the attacker may theoretically be able to construct audience specifications that can be used to search the audience data to obtain details regarding the target individual's behavior. For example, the attacker can first run a search of the audience data using the audience specification that the attacker knows that the individual does not meet. Then the attacker can run the same search modified by adding the audience specification criteria that is only satisfied by the individual. That is, the first search (with a result that exceeds the minimum threshold) joined by a Boolean OR operator to the audience specification that the attackers knows that only the individual of interest satisfies. The result of the second search will be greater than the first search (by one for an individual). The attacker can then use the audience specification of the second search joined with a Boolean AND operator to a third audience specification to determine if the individual meets the third audience specification.

That is, for the example attack scenario, the attacker knows of a first audience specification $S_1$ that is only satisfied by the individual. For example, the attacker might be aware of a number of hobbies or interests of the target individual and corresponding web sites visited by the individual that the attacker can use to construct an audience specification that is only satisfied by the target individual. The audience count returned by a given specification S is denoted as |S|, and |$S_1$| does not return a count since the resulting count does not meet the minimum threshold required by the audience data reporting system 116. The attacker also knows of a second audience specification $S_2$ that is not satisfied by the individual. |$S_2$| is greater than the minimum threshold. If the target individual has opted into the data collection program of the audience data reporting system 116, then |$S_1$ OR $S_2$| will be greater than |$S_2$|. With this knowledge, the attacker can perform a search |($S_1$ OR $S_2$) AND $S_3$| to determine if the individual meets $S_3$ (for example whether or not the individual has visited a certain website or issued a query having a certain keyword). The attacker can determine that the individual meets $S_3$ if |($S_1$ OR $S_2$) AND $S_3$| is greater than |$S_2$ AND $S_3$|.

To prevent an attacker from determining information about an individual (or small group) in this manner, counts reported by the audience data reporting system 116 are generated using sums of randomized weights assigned to audience member matches to hide individual behavior (as opposed to each match having a weight of one). Accordingly, the audience results displayed in FIG. 3 are approximate values, and not exact values. A process of assigning weights can be performed, for example, by a privacy filter 120.

Figure 4:
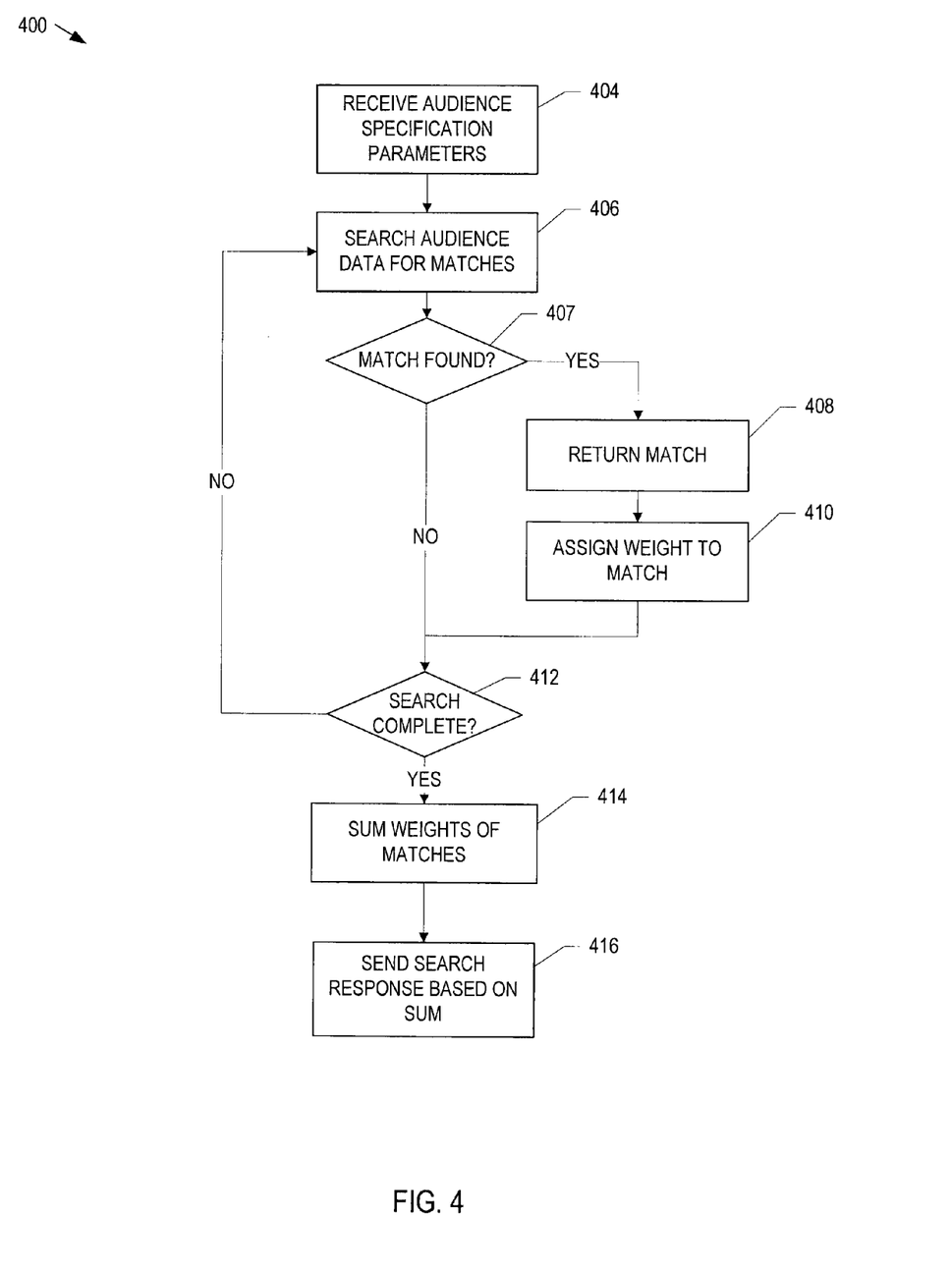
FIG. 4 is flowchart of an example process for masking individual behavior in an audience data reporting system.

FIG. 4 is flowchart of an example process 400 for obfuscating individual behavior in an audience data reporting system. The example process can be implemented in the audience data reporting system 116 of FIG. 1, or in other types of audience data reporting systems.

Audience specification parameters are received (404), for example, at the audience data reporting system 116. The audience data is searched for matches to the received audience specification (406). If a match is found (407), e.g., an audience member identifier that meets the specification, the match is returned (408) and assigned a weight (410). In some implementations, audience member identifiers are integer values, and matching audience member identifiers are retrieved in order from least to greatest value. If there is more audience data to search (412), the process returns to 406. If the search is complete (412), the weights of the identified matches are summed (414) and a response to the search request that is based on the sum of the weights is returned to the requesting user (416). For example, the sum of the weights rounded to a whole number or to a certain number of significant digits can be returned.

Alternatively, the audience data can be searched for matches, and identified matches can be collected. Then collected matches can be sorted to order them by their respective audience data identifier. Weights can then be assigned to the sorted values.

In some implementations, the assigned weights can range from approximately 0.1 to 10 and approach a mean value of 1 as the audience size increases. In some implementations, the assigned weights range from 0.002 to 6.24. The sum of the assigned weights approximates the audience count that would have otherwise been returned if no weights were assigned to the matching audience member identifiers. In a result that has, for example, around 100 member identifiers, the noise introduced by the assigned weights can make up a large percentage of the number returned. On the other hand, for a result set that includes 1 million member identifiers, the noise introduced by the weights will be a small percentage of the reported number. In some implementations, the noise introduced is proportional to 1 divided by the square root of the number of member identifiers. For a millions identifiers, for example, the noise is proportional to 1 divided by 1000 (or 0.1 percent). Returning the sum of the assigned weights (or a number based on this sum) thus makes it more difficult to use the audience data reporting system 116 to determine the habits of individuals or small groups, while still allowing the system to report approximate audience counts.

Figure 5:
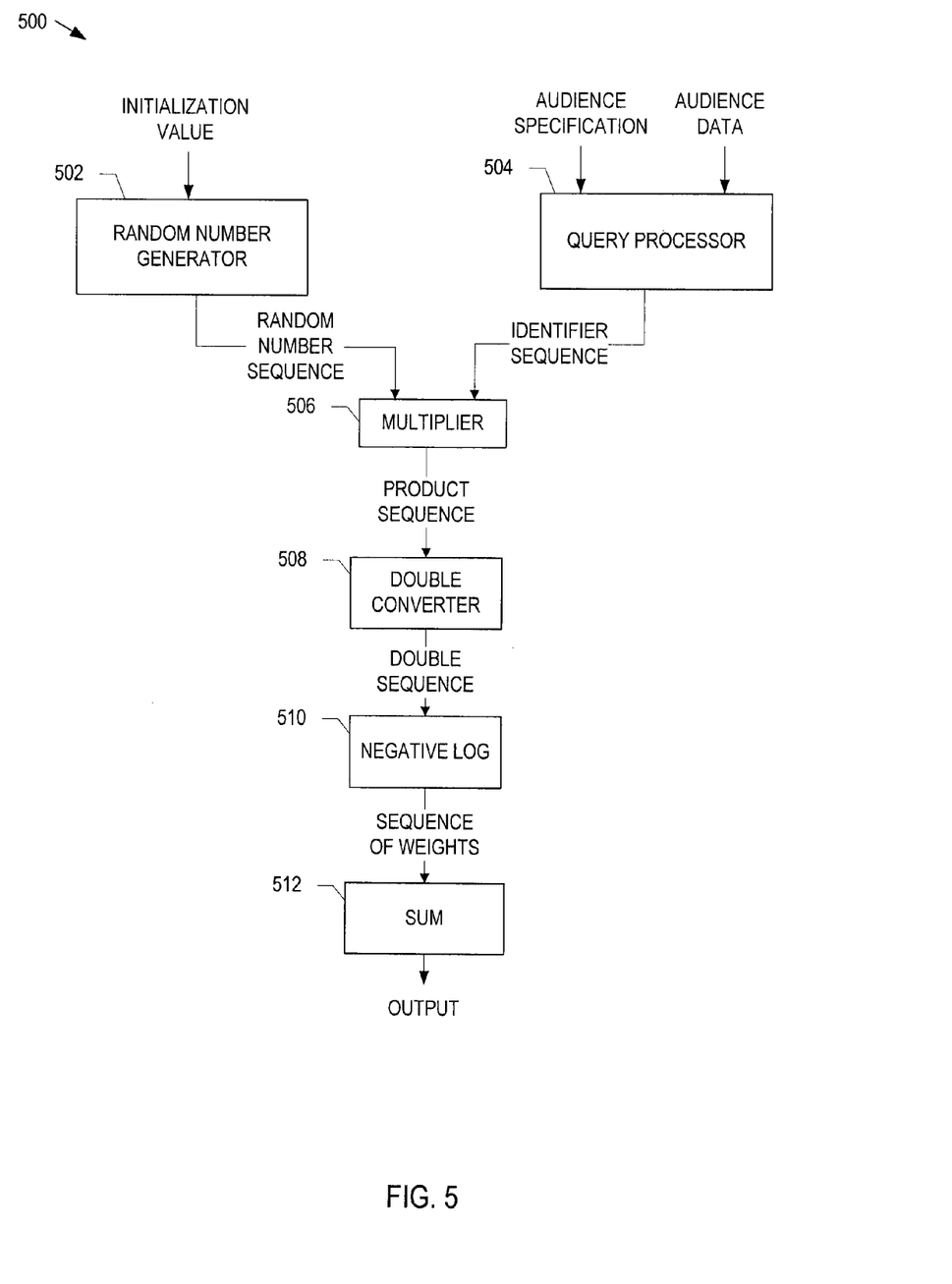
FIG. 5 is a block diagram of an example system for generating and summing weights assigned to audience member matches.
Figure 6A:
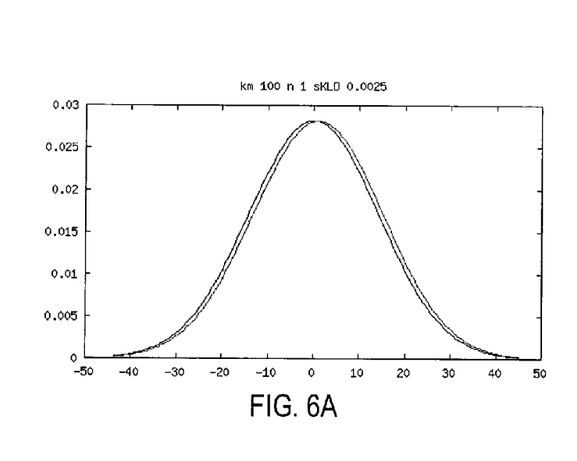
FIGS. 6A-6D show how two distributions diverge as the number of audience specifications used in an attack scenario increases.
Figure 6B:
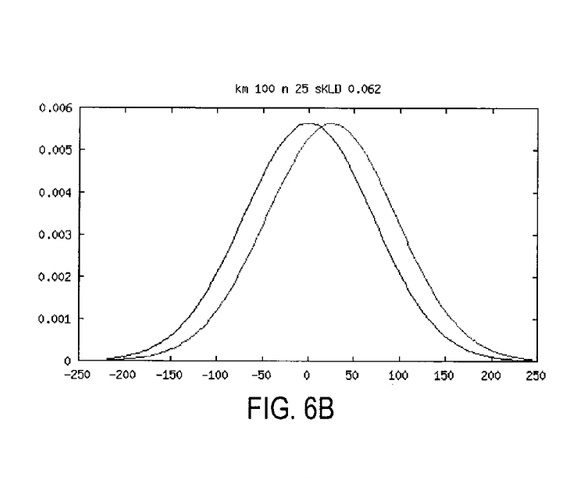
Figure 6C:
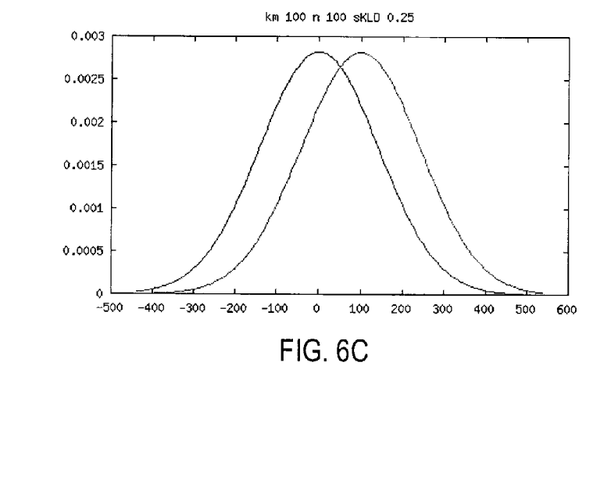
Figure 6D:
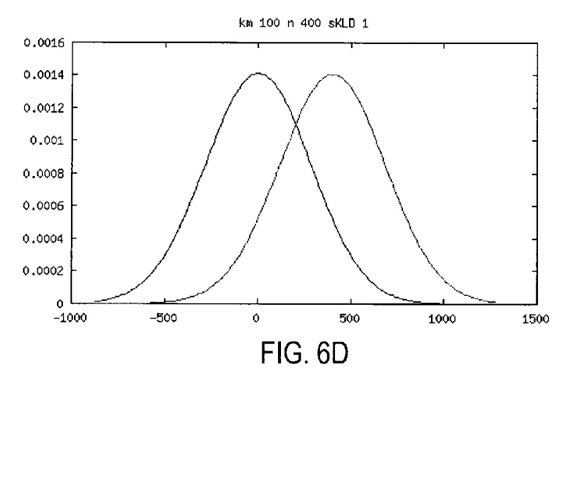

FIG. 5 is a block diagram 500 of an example system for generating and summing weights assigned to audience member identifier matches. The system 500 can, for example, be implemented in the audience data reporting system 116 of FIG. 1.

A random number generator 502 is initialized using a given initialization value and outputs a sequence of random integer numbers. In some implementations, a query is processed by the audience data reporting system 116 at one of a number of servers/system shards 117, and each query processed at a given server/shard uses the same initialization value for the random number generator 502 with each server/shard using a different initialization value. The output of the random number generator 502 is pseudo-random, as is the output of all known computer based random number generators. The term "random", as used herein, includes random as well as pseudo-random. Weight values based on the output of the random number generator 502 are pseudo-random but exhibit statistical randomness and are referred to herein as random weights.

An audience specification is provided to a query processor 504. The query processor searches the audience data to find audience member identifiers that match the audience specification. When a match is found the query processor outputs the audience member identifier corresponding to the matching audience member. In some implementations, identifiers are integers and the query processor returns matches in order of their integer value. For example, if the audience specification matches audience members having integer audience member identifiers of 3, 7, 9, 32, and 67, the integer identifiers are returned in order from least to greatest. In some implementations, an audience member identifier is a 64 bit unsigned integer value included in a web browser cookie. The query processor 504 outputs a sequence of integer identifiers.

The random number sequence and the identifier sequence are provided to a multiplier 506. The multiplier 506 multiplies random numbers from the random number sequence by respective identifiers. For example, the first random number is multiplied by the first identifier; the second random number is multiplied by the second identifier, etc. The output of the multiplier 506 is a product sequence.

The product sequence is passed to a double converter that converts the integer products in the product sequence to decimal values between 0 and 1. For example, to convert a given product from the product sequence to a decimal number, the product can be divided by 257 and 0.5 can be added to the remainder. This number (remainder+0.5) can then be divided by 257 to arrive at a number between 0 and 1. The output of the double converter is a sequence of double numbers between 0 and 1.

The double sequence is provided to a negative log function 510 that outputs the negative log for each double in the double sequence. The output of the negative log function 510 is a sequence of weights having a mean value of 1 for large samples of the assigned weights. The weights in the sequence are provided to a summing function 512 that sums all of the weights to arrive at an output value. This value approximates the count of the number of audience members that match the audience specification, but the habits of individuals and small groups, as identified by corresponding audience member identifiers, are obfuscated by the noise introduced by the weighting process.

In some implementations, the output of the system 500 is independent of the order in which the audience specifications are entered into the user interface. That is, for example, the same number is returned regardless of whether the query is for $|S_1$ AND $S_2|$ or $|S_2$ AND $S_1|$. The same number will be returned in both cases (assuming both queries are processed at the same server/shard) because the random number generator is initialized with the same seed value for all queries (at a given server/shard), and the audience member identifiers are retrieved in order of their value and/or sorted according to their value (e.g., integer value). This has the advantage of the output being consistent as it would be if weights were not being applied to matching audience members.

The process described above is one example for generating weights. Alternative processes for generating weights can be used that assign a series of weights (to audience member identifiers) that have a mean value approaching 1.

The noise introduced by the weighting process makes determining individual behavior more difficult. Through a series of iterative searches, an attacker theoretically may still be able to determine individual behavior. Instead of merely needing one audience specification that the attacker knows the target individual does not satisfy, however, the attacker will need multiple specifications that the individual does not satisfy. The lower threshold below which the audience data reporting system 116 will not return a result can be adjusted to affect the number of specifications (and searches) that an attacker would need to run in order to detect individual behavior in the noise.

For example, for a set of specifications $S_i$ that the attacker knows is not satisfied by the target individual, let:

$|S_i|$=the actual count of identifiers satisfying $S_i$, $<S_i>$=the sum of weights returned for $S_i$, $S_{only\ the\ target}$=the audience specification only satisfied by the target individual $d_S$ (a distribution)=the sum of $<S_i$ OR $S_{only\ the\ target}>-<S_i>$ over all the $S_i$.

$K_S$=the sum of the actual counts $|S_i|$,

N=the number of $S_i$ used to compute $d_S$.

If the target individual is not in the database, $d_S$ will follow a normal distribution with mean zero and variance proportional to $2K_S$.

If the target individual is in the database, $d_S$ will follow a normal distribution with mean proportional to N, and variance proportional to $2(K_S+N)$.

FIGS. 6A-6D show how the divergence of two distributions increases as a number N of audience specifications used in an attack scenario increases. The rightmost distribution curve represents the distribution where the target individual is present in the database, and the leftmost curve represents the distribution where the target individual is not present in the database.

The further the two distributions are apart, the more certain the attacker can be about the presence or absence of the target individual. The Kullback-Liebler divergence (KLD) is the expected information gained from an observation of a value from one of two possible distributions. The KLD is zero for two distributions of they are identical. If the distributions differ, the KLD is positive. For two normal distributions the KLD depends only on the means and the variances. The probability that a value from one distribution will be greater than a value from the other increases with the KLD.

Assuming that each of the counts $\equiv S_i|$ is greater than or equal to a lower threshold $K_m$ (i.e., the threshold below which the system will not return a result), the KLD between the two distributions of $d_S$ will be at most:

$$KLD_{MAX} = \frac{m_w^2}{s_w^2} \frac{N}{4K_m}$$

Where $m_w$ is the mean of the assigned weights, and $s_w$ is the variance of the assigned weights. For the technique described above both $m_w$ and $s_w$ are one such that the equation reduces to:

$$KLD_{MAX} = \frac{N}{4K_m}$$

The rate of information gain allowed by the system can be controlled by choosing how large the KLD will be allowed to be after N audience specifications are input by an attacker. The above equation can then be solved for $K_m$, and the lower threshold of the system can be set to this number.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:
  receiving a query request including an audience specification, wherein the audience specification specifies one or more criterion for identifying audience members of an audience that accessed media content;

identifying a plurality of audience member identifiers corresponding to the audience members that meet the audience specification, each of the plurality of audience member identifiers corresponding to a unique one of the audience members;
for each of the identified audience member identifiers:
    generating a respective random number for the audience member identifier; and
    generating a random weight value for the identified audience member identifier based on a function of the respective random number and the audience member identifier; and
obfuscating results data describing the identified audience member identifiers in a query result value responsive to the query request based on the random weight values for the identified audience member identifiers;
wherein:
generating, for each of the identified audience member identifiers, the respective random number for the audience member identifier comprises initializing a random number generator to a same seed value for each query request;
generating a random weight value comprises:
    for each identified audience member identifier:
        sorting the audience member identifiers in an order based on the value of the audience member identifier;
        multiplying the audience member identifier by a random number output by the random number generator to create a product, wherein the sequence of random numbers output by the random number generator is the same for each query based on the same seed value;
        converting the product to a decimal number between two integers; and
        generating the random weight value by performing a function on the decimal number.

2. The method of claim 1, wherein:
a mean of the random weight values approaches 1 as a number of identified audience member identifiers increases, wherein a sum of the random weight values approximates the number of the identified audience member identifiers.

3. The method of claim 1, wherein:
the audience specification includes a first criteria and a second criteria; and
the query result value is independent of an order in which the first criteria and second criteria appear in the audience specification.

4. The method of claim 1, wherein:
the audience member identifiers match values stored in web browser cookies of respective audience member computers.

5. The method of claim 1, wherein:
identifying a plurality of audience member identifiers comprises determining a number of audience member identifiers that meet the audience specification, wherein the query result value is different from the determined number of audience member identifiers but approximates the determined number of audience member identifiers.

6. A computer-implemented method, comprising:
receiving a query request including an audience specification, wherein the audience specification specifies one or more criterion for identifying audience members of an audience that accessed media content;
identifying a plurality of audience member identifiers corresponding to the audience members that meet the audience specification, each of the plurality of audience member identifiers corresponding to a unique one of the audience members;
for each of the identified audience member identifiers:
    generating a respective random number for the audience member identifier; and
    generating a random weight value for the identified audience member identifier based on a function of the respective random number and the audience member identifier; and
obfuscating results data describing the identified audience member identifiers in a query result value responsive to the query request based on the random weight values for the identified audience member identifiers;
wherein:
receiving a query request including an audience specification comprises receiving the query request at one of a plurality of query shards;
at each query shard, the respective random weight values are based on output of a random number generator using a seed initialization value that is the same for each query received at the query shard; and
the seed initialization value is dependent on the query shard at which the query request is received so that each shard may have a different seed initialization value for each query.

7. A system comprising:
a front end interface configured to receive an audience specification, wherein the audience specification specifies one or more criterion for identifying audience members of an audience that accessed media content;
an audience data store storing a plurality of audience data records for the audience members;
a query processor comprising one or more data processors and configured to search the audience data store to identify records that match the audience specification, wherein each of the identified records corresponds to a unique one of the audience members; and
a privacy filter configured:
    for each of the identified records, to assign a random weight to the identified record based on a function of a respective random number and an audience member identifier corresponding to the identified record, and
    to obfuscate results data describing the identified records in a query result value based on the random weights;
wherein:
the privacy filter is configured to assign a random weight to the identified record by:
generating, for each of the identified audience member identifiers, the respective random number for the audience member identifier comprises initializing a random number generator to a same seed value for each query request;
sorting each identified record in an order based on a value of an audience member identifier of the record and for each identified record:
    multiplying the audience member identifier by the random number output by a random number generator to create a product, wherein the sequence of random numbers output by the random number generator is the same for each query based on the same seed value;
    converting the product to a decimal number between two integers; and
    generating the random weight value by performing a function on the decimal number.

8. The system of claim 7, further comprising:

a user interface device, wherein:

the front end interface is further configured to receive the audience specification from the user interface device and return the query result value to the user interface device.

9. The system of claim 7, wherein:

a mean of the assigned random weights approaches 1 as a number of identified records increases.

10. The system of claim 7, wherein:

the first criteria and the second criteria of the audience specification are joined by a Boolean operator.

11. A system comprising:

a user interface device; and an audience data reporting system comprising one or more data processors and configured to:

generate a count of audience members matching an audience specification received from the user interface device, wherein the audience specification specifies one or more criterion for identifying the audience members that accessed media content and each of the audience members corresponds to a unique one of an audience matching the audience specification;

for each audience member:
  generate a respective random number for the audience member; and
  generate a weight for the audience member based on a function of the respective random number and a unique identifier for the audience member;

mask individual audience member behavior in the count by assigning the respective weight to each audience member in the count; and return a value to the user interface device based on the assigned weights;

wherein:

a plurality of query shards that each process the audience specification, wherein:

at each query shard, the respective random weight values are based on output of a random number generator using an a seed initialization value that is the same for each audience specification received at the query shard; and the seed initialization value is dependent on the query shard at which the audience specification is received so that each shard may have a different seed initialization value for each audience specification.

12. The system of claim 11, wherein:

the value returned is a sum of the assigned weights.

* * * * *

UNITED STATES PATENT AND TRADEMARK OFFICE
CERTIFICATE OF CORRECTION

PATENT NO. : 8,554,779 B1  
APPLICATION NO. : 12/429566  
DATED : October 8, 2013  
INVENTOR(S) : John D. Batali Page 1 of 1

It is certified that error appears in the above-identified patent and that said Letters Patent is hereby corrected as shown below:

Title Page 2, Item (56) Other Publications, Column 2, Line 5-6 – delete "Decording" and insert -- Decoding --, therefor.

Signed and Sealed this  
Twenty-ninth Day of April, 2014

Michelle K. Lee  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,554,779 B1 | Page 1 of 1 |
| APPLICATION NO. | : 12/429566 | |
| DATED | : October 8, 2013 | |
| INVENTOR(S) | : Batali | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 426 days.

Signed and Sealed this
Nineteenth Day of May, 2015

Michelle K. Lee
*Director of the United States Patent and Trademark Office*